(12) United States Patent
Varrassi et al.

(10) Patent No.: US 12,222,072 B2
(45) Date of Patent: Feb. 11, 2025

(54) CRYOGENIC TANK FOR STORING LIQUEFIED FLUID

(71) Applicant: CRYOLOR, Argancy (FR)

(72) Inventors: Lucien Varrassi, Porcelette (FR); Etienne Gibaux, Ennery (FR)

(73) Assignee: CRYOLOR, Argancy (FR)

( * ) Notice: Subject to any disclaimer, the term of this patent is extended or adjusted under 35 U.S.C. 154(b) by 149 days.

(21) Appl. No.: 17/970,142

(22) Filed: Oct. 20, 2022

(65) Prior Publication Data

US 2023/0123339 A1    Apr. 20, 2023

(30) Foreign Application Priority Data

Oct. 20, 2021  (FR) ........................................ 2111123

(51) Int. Cl.
*F17C 3/08* (2006.01)

(52) U.S. Cl.
CPC ........ *F17C 3/08* (2013.01); *F17C 2201/0109* (2013.01); *F17C 2203/0391* (2013.01); *F17C 2203/0629* (2013.01); *F17C 2221/012* (2013.01); *F17C 2221/017* (2013.01); *F17C 2223/0161* (2013.01); *F17C 2270/0171* (2013.01)

(58) Field of Classification Search
CPC ....................................................... F17C 1/08
See application file for complete search history.

(56) References Cited

U.S. PATENT DOCUMENTS

| | | | |
|---|---|---|---|
| 2,858,136 | A | 10/1958 | Rind |
| 3,037,657 | A | 6/1962 | Hampton et al. |
| 4,343,413 | A | 8/1982 | Chatzipetros et al. |
| 4,496,073 | A | 1/1985 | Silver et al. |
| 10,928,007 | B2 | 2/2021 | Posselt et al. |
| 2008/0053993 | A1* | 3/2008 | Yang ........................ B63B 25/16 220/4.12 |

FOREIGN PATENT DOCUMENTS

| | | | |
|---|---|---|---|
| DE | 261 635 | | 11/1988 |
| DE | 281319 | A * | 8/1990 |
| RU | 2 709 750 | | 12/2019 |

OTHER PUBLICATIONS

French Search Report for corresponding FR 2111123, Jun. 10, 2022.

\* cited by examiner

*Primary Examiner* — Stephen J Castellano
(74) *Attorney, Agent, or Firm* — Elwood L. Haynes

(57) ABSTRACT

Cryogenic tank for storing liquefied fluid, having an inner shell delimiting a storage volume for liquefied fluid and an outer shell arranged in a spaced manner around the inner shell, the space between said inner and outer shells having a thermal insulation, a first mechanical connection having a first support wall of truncated cone shape whose larger-diameter end is rigidly connected to the outer shell and whose smaller-diameter end is connected to the inner shell, wherein a second mechanical connection has a second support wall of truncated cone shape whose larger-diameter end is rigidly connected to the outer shell and whose smaller-diameter end is connected to the inner shell.

5 Claims, 2 Drawing Sheets

CRYOGENIC TANK FOR STORING LIQUEFIED FLUID

CROSS REFERENCE TO RELATED APPLICATIONS

This application claims the benefit of priority under 35 U.S.C. § 119 (a) and (b) to French Patent Application No. 2111123, filed Oct. 20, 2021, the entire contents of which are incorporated herein by reference.

BACKGROUND

The invention relates to a cryogenic tank for storing liquefied fluid.

The invention relates more particularly to a cryogenic tank for storing liquefied fluid, comprising an inner shell delimiting a storage volume for liquefied fluid and an outer shell arranged in a spaced manner around the inner shell, the space between said inner and outer shells comprising a thermal insulation, the inner and outer shells extending in a longitudinal direction between two longitudinal ends, the tank comprising a structure for holding the inner shell in the outer shell, the holding structure being composed of a first mechanical connection between a first longitudinal end of the inner shell and a first longitudinal end of the outer shell, and of a second mechanical connection between the second longitudinal end of the inner shell and the second longitudinal end of the outer shell, the first mechanical connection comprising a first support wall of general truncated cone shape whose larger-diameter end is rigidly connected to the outer shell and whose smaller-diameter end is connected to the inner shell.

The invention relates, for example, to fixed or mobile tanks, in particular cryogenic semi-trailers for transporting liquefied air gases (helium or hydrogen, for example), liquefied natural gas or any other fluid or mixture.

The manufacture of double-shell cryogenic tanks requires a great deal of care in the assembly of the shells and in particular for holding the inner shell in the outer shell. The structure must limit the entries of heat towards the interior while being adapted to relative expansions/retractions of the parts during switches between the hot configuration (tank at ambient temperature) and cold configuration (inner tank at cryogenic temperature, for example below −150° C.) Moreover, the structure must be capable of withstanding and taking up forces.

The known solutions do not make it possible to meet all these requirements in an optimal manner.

SUMMARY

An object of the present invention is to overcome all or some of the drawbacks of the prior art noted above.

To this end, the cryogenic tank according to the invention, otherwise in accordance with the generic definition given thereof in the above preamble, is essentially characterized in that the second mechanical connection comprises a second support wall of general truncated cone shape whose larger-diameter end is rigidly connected to the outer shell and whose smaller-diameter end is connected to the inner shell.

Furthermore, embodiments of the invention may have one or more of the following features:

the structure for holding the inner shell in the outer shell is formed by the first support wall and by the second support wall, the first support wall is inclined by an angle of between zero degrees and 30 degrees and preferably 5 degrees with respect to the longitudinal direction, the second support wall is inclined by an angle of between 60 degrees and 89 degrees and preferably 85 degrees with respect to the longitudinal direction, the first support wall is oriented in such a way that the truncated cone converges in the direction of the second longitudinal end, the second support wall is oriented in such a way that the truncated cone converges in the direction of the second longitudinal end, the second support wall constitutes a mechanical connection between the two shells that is more deformable than the first support wall, that is to say that the second support wall is configured so that, during a temperature differential between the two shells generating a relative retraction or expansion of the shells, it allows a relative longitudinal movement between the two shells at the second end, this relative movement being greater than the relative longitudinal movement allowed by the deformation of the first support wall between the two shells at the first end, the inner and outer shells each comprise a cylindrical portion of circular cross section extending in the longitudinal direction and whose two ends are closed by walls in the form of domes, the ends of the support walls being rigidly connected to the cylindrical portions, the support walls have a thickness of between 1 and 5 mm and preferably between 1 and 3 mm, in the use configuration of the tank, the longitudinal direction is horizontal.

The invention may also relate to any alternative device or method comprising any combination of the features above or below within the scope of the claims,

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
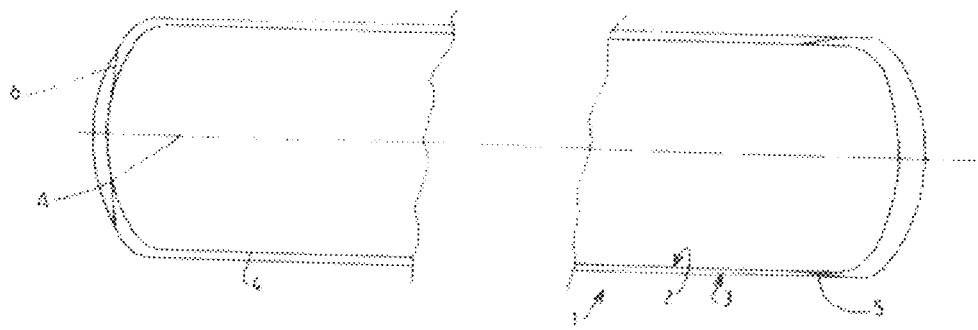
FIG. 1 represents a schematic and partial view in vertical and longitudinal cross section illustrating an example of one possible embodiment of the invention.
Figure 2:
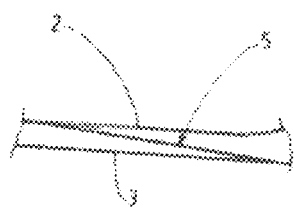
FIG. 2 represents a view in cross section of a detail B of a first end of the tank of the exemplary embodiment of FIG. 1.
Figure 3:
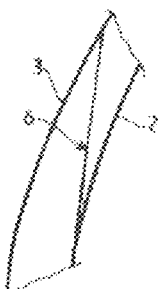
FIG. 3 represents a view in cross section of a detail A of a second end of the tank of the exemplary embodiment of FIG. 1.
Figure 4:
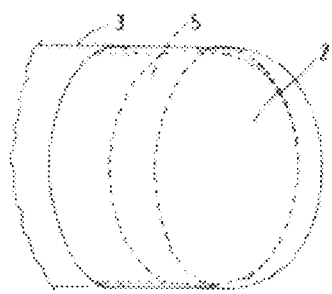
FIG. 4 represents a schematic and transparent perspective view of the first end of the tank of the exemplary embodiment of FIG. 1.
Figure 5:
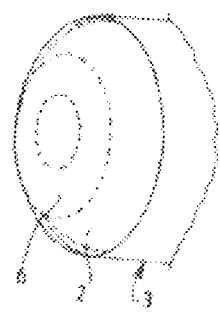
FIG. 5 represents a schematic and transparent perspective view of the second end of the tank of the exemplary embodiment of FIG. 1.

The cryogenic tank 1 for storing liquefied fluid, which is illustrated by way of example, comprises an inner shell 2 delimiting a storage volume for liquefied fluid and an outer shell 3 arranged in a spaced manner around the inner shell 2.

The space between the inner 2 and outer 3 shells comprises a thermal insulation 4, for example a thermal insulant of the multilayer type ("MU"). This space is preferably held under vacuum.

The inner 2 and outer 3 shells extend in a longitudinal direction A between two longitudinal ends.

In the use configuration of the tank 1, this longitudinal direction A is preferably horizontal (horizontal tank).

The tank 1 is preferably of cylindrical type (cylindrical portion dosed at each end by a curved wall in the form of a dome).

The tank 1 comprises a structure for holding (or supporting) the inner shell 2 in the outer shell 3. This holding structure is composed of (and preferably formed by) two connections respectively situated at the two longitudinal ends. The holding structure comprises a first mechanical connection 5 between a first longitudinal end of the inner shell 2 and a first longitudinal end of the outer shell 3, and a second mechanical connection 6 between the second longitudinal end of the inner shell 2 and the second longitudinal end of the outer shell 3.

The first mechanical connection comprises a first support wall 5 of general truncated cone shape whose larger-diameter end is rigidly connected to the outer shell 3 and whose smaller-diameter end is connected to the inner shell 2.

The first support wall 5 is preferably inclined by an angle of between zero degrees (preferably greater than zero) and 30 degrees and preferably five degrees with respect to the longitudinal direction A.

The second mechanical connection comprises a second support wall 6 of general truncated cone shape whose larger-diameter end is rigidly connected to the outer shell 3 and whose smaller-diameter end is connected to the inner shell 2.

The second support wall 6 is preferably inclined by an angle of between 60 degrees and 89 degrees and preferably 85 degrees with respect to the longitudinal direction.

As illustrated, the first support wall 5 is preferably oriented in such a way that the truncated cone converges in the direction of the second longitudinal end (towards the left in the schematic representation).

The second support wall 6 is preferably oriented in such a way that the truncated cone converges in the direction of the second longitudinal end.

Preferably, the second support wall 6 constitutes a connection between the two shells 2, 3 that is more deformable (relatively more flexible connection) than the first support wall 5 (relatively more rigid connection). That is to say that the second support wall 6 is configured so that, during a temperature differential between the two shells 2, 3 generating a relative retraction or expansion of the shells 2, 3, it allows a relative longitudinal movement between the two shells 2, 3 at the second end that is greater than the relative longitudinal movement allowed by the first support wall 5 at the first end.

These relative degrees of flexibility or rigidity can be chosen by adapting the relative orientations (inclinations) of the walls 5, 6 and/or their dimension (in particular thickness) and/or their materials.

Thus, the inner shell 2 can be supported in the outer shell 3 by two conical walls 5, 6, one of which is relatively more deformable and configured in particular to deform during the relative contraction of the chilled inner shell 2. This deformation is configured to make it possible to absorb the variations in the relative dimensions of the two shells 2, 3 without impairing the holding of the inner shell in the outer shell 3 and without affecting the thermal insulation.

In particular, this architecture allows a deformation of the second support wall 6 that is close to the relative longitudinal contraction of the inner shell 2 (and that allows this contraction of the inner shell 2).

The second support wall 6 may be formed, for example, of steel, for example a stainless steel of the 304 or 316 type.

When filling the inner shell 2 with cryogenic liquid, the thermal gradient (from the outside ambient temperature to the temperature of the cryogenic liquid on the inside: for example between −269° C. and −180° C.) that will be experienced by this second wall 6 will make it possible to accompany the thermal contraction of the inner shell 2 at the second end, whereas the first end (at the first connection 5, considered as a fixed point) will undergo a zero or smaller deformation. During its contraction, the inner shell 2 (at least one end connected to the inner shell 2) will move longitudinally relatively towards the first (relatively fixed) end.

Note that the term "flexible" used above does not necessarily mean that the second wall 6 is intrinsically "flexible". Specifically, the conical geometry is by nature relatively rigid in comparison to a flat metal sheet. On the other hand, this second support wall 6 is configured to deform (longitudinal movement) in response to the changes of temperature while allowing resistance to radial forces. In particular, the second support wall 6 is thus able and configured to maintain sufficient rigidity in the radial (transverse) directions in order to take up the forces.

This first connection 5 is therefore a fixed point with respect to the thermodynamics. This first connection is preferably configured to:

transmit the radial (vertical and lateral) forces (for example between the two shells 2, 3), transmit the longitudinal forces (acceleration of 2g for example) (for example between the two shells 2, 3).

During its deformation, the second wall 6 can, for example, be inclined so as to come slightly closer to the longitudinal direction A.

At least the first support wall 5 can be formed of one or more assembled parts, for example two welded rigid half-cones (for example made of stainless steel, such as of the type 304 or 316). The structure in the form of two half-cones can in particular make it possible to centre the inner shell 2 in the outer shell 3 during mounting.

As illustrated, the connection between the first support wall 5 and the outer shell 3 can be fastened (welded) very close to the end wall (end) of the outer shell 3, preferably at the cylindrical parts of the shells 2, 3, for example in the vicinity of inter-wall pipework (not shown for the sake of simplification).

Likewise, the second support wall 6 can be fastened (welded) very close to the end wall (end) of the inner shell 2.

Note that the structure for holding the inner shell 2 in the outer shell 3 is preferably formed by the first support wall 5 and second support wall 6. That is to say that, preferably, there is no other structure for supporting the inner shell 2. However, one or more other additional connections (tie rod(s) for example) can be envisaged.

Moreover, the tank may comprise connection elements between the shells 2, 3, in particular for the passage or guidance of pipework between the shells 2, 3 (but these elements do not necessarily ensure a function of supporting that is comparable to that of the two walls 5, 6).

Note that the shape of the support wall(s) is designated as "general truncated cone shape". This means that the wall in question can in fact be in the form of a truncated cone.

However, any other similar shape can be envisaged, in particular a curved shape similar to a cone.

What is claimed is:

1. A cryogenic tank for storing liquefied fluid, comprising an inner shell delimiting a storage volume for liquefied fluid and an outer shell arranged in a spaced manner around the inner shell, the space between said inner and outer shells comprising a thermal insulation, the inner and outer shells extending in a longitudinal direction between two longitudinal ends, the tank comprising a structure for holding the inner shell in the outer shell, the holding structure being composed of a first mechanical connection between a first longitudinal end of the inner shell and a first longitudinal end of the outer shell, and of a second mechanical connection between the second longitudinal end of the inner shell and the second longitudinal end of the outer shell, the first mechanical connection comprising a first support wall of general truncated cone shape whose larger-diameter end is rigidly connected to the outer shell and whose smaller-diameter end is connected to the inner shell, wherein the second mechanical connection comprises a second support wall of general truncated cone shape whose larger-diameter end is rigidly connected to the outer shell and whose smaller-diameter end is connected to the inner shell, wherein the second support wall is inclined by an angle of between 60 degrees and 89 degrees with respect to the longitudinal direction.

2. The tank according to claim 1, wherein the structure for holding the inner shell in the outer shell is formed by the first support wall and by the second support wall.

3. The tank according to claim 1, wherein the first support wall is inclined by an angle of between zero degrees and 30 degrees with respect to the longitudinal direction.

4. The tank according to claim 1, wherein the second support wall constitutes a mechanical connection between the two shells that is more deformable than the first support wall the second support wall is configured so that, during a temperature differential between the two shells generating a relative retraction or expansion of the shells, a relative longitudinal movement is allowed between the two shells at the second end, this relative movement being greater than the relative longitudinal movement allowed by the deformation of the first support wall between the two shells at the first end.

5. The tank according to claim 1, wherein the support walls have a thickness of between 1 and 5 mm.

* * * * *